Dec. 30, 1958

R. J. BREAUX 2,866,281

LAND LEVELER

Filed May 31, 1956

INVENTOR.

Rodney J. Breaux.

BY Victor J. Evans & Co.

ATTORNEYS

Dec. 30, 1958  R. J. BREAUX  2,866,281
LAND LEVELER
Filed May 31, 1956  2 Sheets-Sheet 2
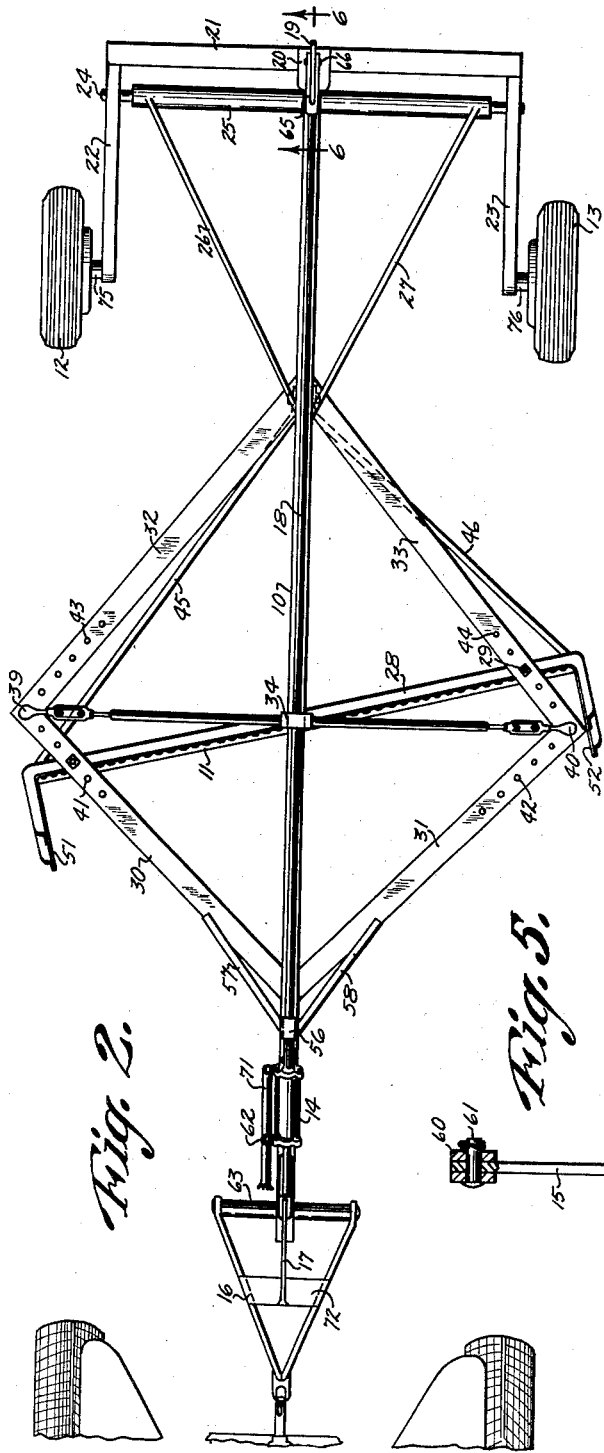
Fig. 2.
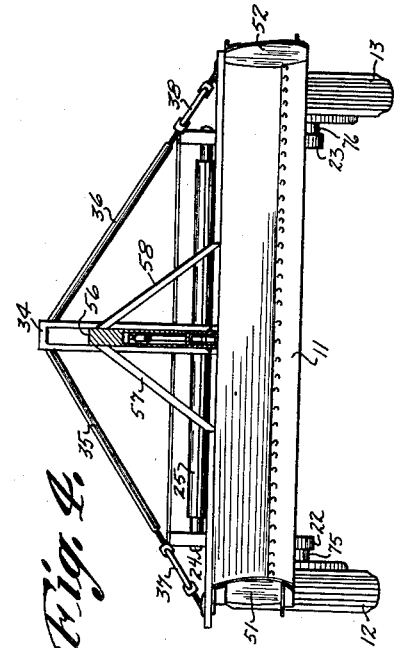
Fig. 4.
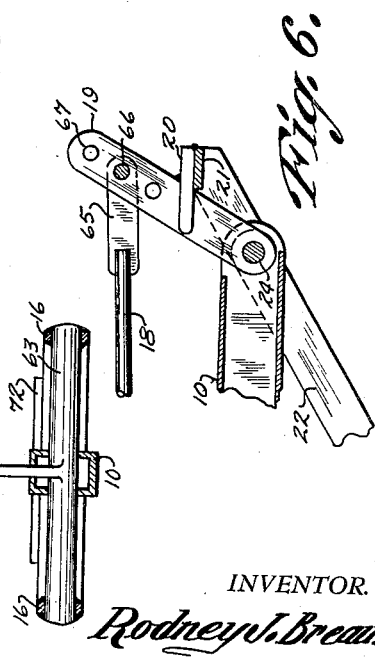
Fig. 5.
Fig. 6.
INVENTOR.
Rodney J. Breaux.
BY Victor J. Evans & Co.
ATTORNEYS

United States Patent Office 2,866,281
Patented Dec. 30, 1958

2,866,281

LAND LEVELER

Rodney J. Breaux, Welsh, La.

Application May 31, 1956, Serial No. 588,522

5 Claims. (Cl. 37—168)

This invention relates to road building and earth moving machinery and equipment, and in particular a centrally positioned longitudinally disposed beam having a diamond-shaped intermediate section below which a scraper blade is positioned with wheels carried by pivotally mounted arms on the trailing end and with a hydraulic cylinder actuated hitch connection on the leading end and a rod positioned above the beam for connecting the hitch connection to the arms upon which the wheels at the trailing end are mounted whereby with fluid under pressure supplied to opposite ends of the hydraulic cylinder the blade carrying frame is elevated and lowered.

The purpose of this invention is to provide a scraper blade mounting wherein the elevation of the blade is adapted to be adjusted by means of a hydraulic cylinder and connecting levers from a towing tractor.

Various types of scrapers have been provided for road building and other construction. However, it is difficult to adjust the elevation of a blade from a towing vehicle and it is also difficult to adjust both ends of a mounting frame of the blade simultaneously.

With this thought in mind this invention contemplates a comparatively simple frame comprising a centrally positioned longitudinally disposed beam with a diamond-shaped intermediate frame mounted on the beam and below which a scraper blade is positioned, with a hitch on the leading end and with rear wheels rotatably mounted on arms pivotally connected to the trailing end of the frame and actuated by a rod extended from the hitch.

The object of this invention is, therefore, to provide an improved land leveler wherein the elevation of a scraper blade thereof is adapted to be adjusted from the operator's seat of a towing vehicle.

Another object of the invention is to provide means for connecting wheels on the trailing end of an implement frame to elevational adjusting means on the leading end whereby both ends of the frame are raised and lowered simultaneously.

A further object of the invention is to provide an improved land leveler having a transversely disposed scraper blade mounted on a longitudinally positioned beam with wheels adjustably mounted on the trailing end of the beam and with the wheel mounting elements connected to adjustable hitch elements on the leading end of the beam.

A further object of the invention is to provide a scraper including a longitudinally positioned beam with wheels mounted on arms of a yoke pivotally attached to the beam, with a hitch pivotally mounted on the leading end of the beam and with a hydraulic cylinder positioned to coact with the hitch on the leading end of the beam for elevating and lowering the frame and wheels on the trailing end thereof simultaneously, in which the device is of a simple and economical construction.

With these and other objects and advantages in view the invention embodies a horizontally positioned longitudinally disposed beam having a triangular shaped frame pivotally mounted by a shaft on the leading end with the intermediate part of the frame connected by an arm to a vertically disposed strut also pivotally mounted in the leading end of the beam, with an anchoring post positioned on the beam and spaced from the strut, with a diamond-shaped frame on the intermediate part of the beam, with a scraper blade positioned below the diamond-shaped frame and with wheels rotatably mounted on extended ends of arms of a yoke with the arms pivotally mounted on the trailing end of the beam and with the yoke connected by a rod to the strut on the leading end of the beam providing means for actuating the wheels at the trailing end of the beam with a hydraulic cylinder mounted on the anchoring post and positioned with a piston therein connected by a piston rod to said strut.

Other features and advantages of the invention will appear from the following description taken in connection with the drawings, wherein:

Figure 2 is a plan view of the land leveler.

Figure 3 is an elevational view looking toward the opposite side of the leveler, from that shown in Fig. 1 showing the scraper blade or plow of the device in use.

Figure 4 is a cross section through the land leveler taken on line 4—4 of Fig. 1.

Figure 5 is a similar section taken on line 5—5 of Fig. 1 showing the mounting of a strut on the beam of a land leveler with the parts shown on an enlarged scale.

Figure 6 is a longitudinal section through the land leveler showing the arrangement of the pivotally mounted strut mounted on a shaft at the trailing end of the device and showing the device with the parts positioned as illustrated in Fig. 1.

Figure 7 is a cross section through the hydraulic cylinder for actuating the parts of the land leveler to adjust the elevation of the scraper blade, the parts being shown on an enlarged scale.

Figure 8 is a longitudinal section through the hydraulic cylinder taken on line 8—8 of Fig. 7, parts of the intermediate part of the cylinder being broken away.

Figure 1:
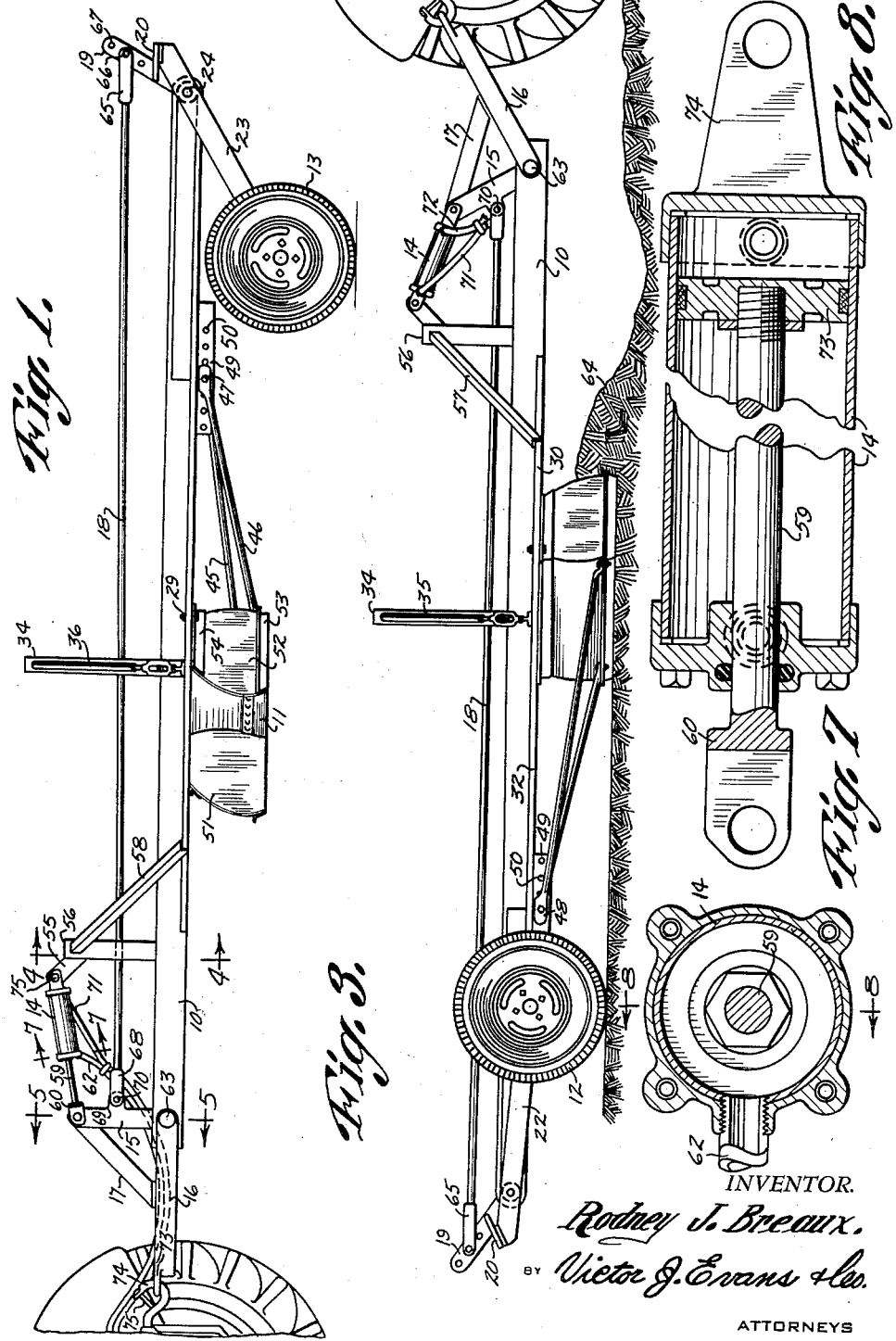
Figure 1 is a side elevational view of the improved soil leveler with the parts shown in elevated positions.

Referring now to the drawings wherein like reference characters denote corresponding parts the improved land leveler of this invention includes a centrally positioned longitudinally disposed mounting beam 10, a scraper blade 11, rear wheels 12 and 13, a hydraulic cylinder 14, a strut 15 pivotally mounted in the forward end of the beam and connected to a triangular-shaped hitch frame 16 with a brace 17, and a rod 18 connecting the strut 15 to an arm 19 pivotally mounted in the trailing end of the beam and connected by a plate 20 to a bar 21 secured to upper ends of arms 22 and 23 on which the wheels 12 and 13 are rotatably mounted and which are pivotally mounted on a shaft 24 extended through a sleeve 25 which is mounted in the trailing end of the beam and which is supported from the beam with diagonal braces 26 and 27.

In the design shown, the beam 10 is rectangular-shaped and tubular and the scraper blade 11 is suspended below the beam with an angle bar 28 on the upper edge of the blade secured to a diamond-shaped frame with bolts 29. The diamond-shaped frame includes forward bars 30 and 31 and rear bars 32 and 33 and, as illustrated in Fig. 4 the frame is supported from a post 34 with diagonal braces 35 and 36 having turn buckles 37 and 38, respectively therein, the extended ends of the turn buckles being anchored to the corners of the diamond-shaped frame with lugs 39 and 40.

The bars 30 and 31 of the diamond-shaped frame are provided with bolt holes 41 and 42, and the bars 32 and 33 are provided with similar holes 43 and 44, respectively whereby the position of the blade 11 may readily be adjusted. The blade is also supported with diagonally disposed braces 45 and 46, the trailing ends of which are secured by bolts 47 and 48 to an angle bar 49 which is provided with spaced bolt holes or openings 50. By this means the scraper blade is rigidly supported and, at the same time, readily adjusted to different angular positions.

The ends of the scraper blade 11 are provided with wings 51 and 52, the lower edges of which are reinforced with an angle bar 53 and the upper edges of which with a similar angle bar 54.

One end of the hydraulic cylinder 14 is anchored by an arm 55 to a post 56 extended upwardly from the beam 10 and the post is supported with diagonally positioned braces 57 and 58, the lower ends of which are secured, such as by welding, to the bars 31 and 30. The piston rod 59 extended from the opposite end of the cylinder 14 is pivotally connected by a clevis 60 with a pin 61 extended therethrough to the upper end of the strut 15 whereby with fluid under pressure applied to the end of the cylinder, from which the piston rod 59 extends, through a tube 62 the upper end of the strut 15 is drawn toward the cylinder with the result that the triangular-shaped hitch frame 16 is turned about the center of the rod 63, which extends through the forward end of the beam 10, to the position shown in Fig. 3 wherein the frame is dropped downwardly with the scraper blade digging into soil 64, as shown in Fig. 3. With this movement of the strut 15 the arm 19 is actuated by the rod 18, moving the arm 19 rearwardly and elevating the wheels 12 and 13 whereby the trailing end of the frame also drops downwardly.

The rod 18 is connected by a clevis 65 to the arm 19 with a bolt 66 extended through one of the openings 67 in the arm, and the forward end of the rod is connected by a clevis 68 to an ear 69 on the strut 15 with a bolt 70. Pressure applied to the opposite end of the cylinder 14 through the hose connection 71, drives the piston back to the position shown in Fig. 1.

The brace 17 is connected to the side bars of the hitch frame 16 with a plate 72 and the extended end of the frame 16 is provided with an eye 73 that is adapted to be positioned upon a hook 74 across the open end of which the locking pin 75 is positioned.

As illustrated in Fig. 8 the hydraulic cylinder 14 is provided with a piston 73 to which the inner end of the piston rod 59 is connected and one end of the cylinder is provided with ears 74, which straddle an arm 55 extended from the post 56 and which are pivotally connected to the arm with a bolt 75. It will be understood that a hydraulic cylinder of any suitable type may be used.

The wheels 12 and 13 are rotatably mounted on studs 75 and 76 extended from ends of the arms 22 and 23.

With the parts assembled as illustrated and described and with the eyes 73 secured on a hook 74 of a tractor and the tubes 62 and 71 connected to a pump, or fluid pressure storage means of a tractor fluid is supplied, alternately, to opposite ends of the cylinder 14 whereby the piston rod 59 is adapted to be extended or retracted to lower or elevate the scraper blade 11 and with the fluid controlled by valves on the tractor the elevation of the scraper blade may be continuously adjusted as the device is used.

The angular position of the scraper blade is also adapted to be adjusted by changing the positions of the bolts 29 whereby soil may be moved to either side of the leveler or moved straight ahead, as may be desired.

It will be understood that modifications, within the scope of the appended claims, may be made in the design and arrangement of the parts without departing from the spirit of the invention.

What is claimed is:

1. A leveler comprising a longitudinally disposed center beam, wheels adjustably mounted on the trailing end of the beam, a diamond-shaped frame with triangular-shaped sections on opposite sides of the beam and extended laterally therefrom, the said diamond-shaped frame being positioned on the intermediate part of the beam, a scraper blade positioned below the beam, means for adjustably connecting ends of the blade to extended portions of the triangular-shaped section of the diamond-shaped frame, means for connecting the leading end of the beam to a tractor, a post mounted on the beam and extended upwardly therefrom, braces extended from the upper end of the post to laterally disposed corners of the triangular-shaped sections of the diamond-shaped frame, means in the braces for adjusting the length thereof to level said triangular-shaped sections and means for adjusting the elevation of the beam and scraper blade.

2. A scraper comprising a longitudinally disposed beam, a diamond-shaped frame with triangular-shaped sections on opposite sides of the beam and extended laterally therefrom, the said diamond-shaped frame being positioned on the intermediate part of the beam, a transversely positioned scraper blade suspended from the extended portions of the triangular-shaped sections of the diamond-shaped frame, wheels adjustably mounted on the trailing end of the beam, a post mounted on the beam and extended upwardly therefrom, braces extended from the upper end of the post to laterally disposed corners of the triangular-shaped sections of the diamond-shaped frame, means in the braces for adjusting the length thereof to level said triangular-shaped sections, a hitch adjustably mounted on the leading end of the beam for connecting the beam to a tractor, and hydraulic means for actuating the hitch and mounting for the wheels at the trailing end of the beam for adjusting the elevation of the beam.

3. A ground leveler comprising a longitudinally positioned center beam having a diamond-shaped frame on the intermediate part thereof, a transversely positioned scraper blade, means for adjustably connecting ends of the scraper blade to parts of the diamond-shaped frame, wheels rotatably mounted on arms pivotally mounted on the trailing end of the beam, a hitch pivotally mounted on the leading end of the beam, a hydraulic cylinder mounted on the beam and having a piston rod thereof connected to the hitch, and means operatively connecting the hitch to the wheel mounting at the trailing end of the beam whereby the elevation of the beam and scraper blade are adjusted by the hydraulic cylinder.

4. In an earth leveling machine, the combination which comprises a centrally positioned longitudinally disposed beam, a diamond-shaped frame positioned on the intermediate part of the beam, said frame having triangular-shaped sections extended from opposite sides thereof, a transversely disposed scraper blade having forwardly extended wings at the end positioned with ends thereof adjustably mounted on laterally extended portions of the diamond-shaped frame, wheel carrying arms pivotally mounted on the trailing end of the beam, an arm having spaced openings therein extended upwardly from said pivotally mounted arms, a hitch frame pivotally mounted on the leading end of the beam, a strut extended upwardly from the hitch frame, a post extended upwardly from the beam, a hydraulic cylinder pivotally mounted on the upper end of the post and having a piston rod pivotally connected to the upper end of the strut, and a rod extended from the strut to the arm extended upwardly from the pivotally mounted arms on which the wheels are carried whereby the elevation of the beam and scraper is adjusted by the hydraulic cylinder.

5. In an earth leveling machine, the combination which comprises a centrally positioned longitudinally disposed beam, a diamond-shape frame positioned on the intermediate part of the beam and having triangular-shaped sections extended from opposite sides thereof, a transversely disposed scraper blade having forwardly extended wings at the ends positioned with ends thereof adjustably mounted on extended portions of the diamond-shaped frame, wheel carrying arms pivotally mounted on the trailing end of the beam, an arm having spaced openings therein extended upwardly from said pivotally mounted arms, a hitch frame pivotally mounted on the leading end of the beam, a strut extended upwardly from the hitch frame, a post extended upwardly from the beam, a hydraulic cylinder pivotally mounted on the upper end of the post and having a piston rod pivotally connected to the upper end of the strut, a rod extended from the strut to the arm extended upwardly from the pivotally mounted arms on which the wheels are carried whereby the elevation of the beam and scraper is adjusted by the hydraulic cylinder, a second post extended upwardly from the beam and connected by adjustable diagonal braces to ends of the diamond-shaped frame, and supporting elements extended from the blade to the rear portion of the beam.

References Cited in the file of this patent

UNITED STATES PATENTS

| | | |
|---|---|---|
| 1,570,140 | Gilbert | Jan. 19, 1926 |
| 1,654,636 | Coad | Jan. 3, 1928 |
| 2,320,742 | Newkirk | June 1, 1943 |
| 2,713,296 | Silver et al. | July 19, 1955 |
| 2,716,933 | Smith | Sept. 6, 1955 |
| 2,739,396 | Frenzel | Mar. 27, 1956 |
| 2,767,538 | Scheidenhelm | Oct. 23, 1956 |